United States Patent
Fan et al.

(10) Patent No.: US 11,878,420 B2
(45) Date of Patent: Jan. 23, 2024

(54) HIGH-PRECISION MOBILE ROBOT MANAGEMENT AND SCHEDULING SYSTEM

(71) Applicant: SHAANXI UNIVERSITY OF SCIENCE AND TECHNOLOGY, Xi an (CN)

(72) Inventors: Xiaopu Fan, Xi an (CN); Ning Song, Xi an (CN)

( * ) Notice: Subject to any disclaimer, the term of this patent is extended or adjusted under 35 U.S.C. 154(b) by 688 days.

(21) Appl. No.: 16/971,694

(22) PCT Filed: Dec. 26, 2019

(86) PCT No.: PCT/CN2019/128626
§ 371 (c)(1),
(2) Date: Aug. 21, 2020

(87) PCT Pub. No.: WO2021/012607
PCT Pub. Date: Jan. 28, 2021

(65) Prior Publication Data
US 2023/0103159 A1    Mar. 30, 2023

(30) Foreign Application Priority Data
Jul. 25, 2019 (CN) .......................... 201910674651.1

(51) Int. Cl.
*B25J 9/16* (2006.01)
(52) U.S. Cl.
CPC .................. *B25J 9/1661* (2013.01)
(58) Field of Classification Search
CPC . B25J 9/1661; B25J 9/10; B25J 9/1602; B25J 18/00; B25J 5/00; B25J 5/007;
(Continued)

(56) References Cited

U.S. PATENT DOCUMENTS

2015/0316925 A1* 11/2015 Frisk .................. B25J 9/162
901/1
2018/0129201 A1    5/2018 Douglas et al.
(Continued)

FOREIGN PATENT DOCUMENTS

CN        106476003 A      3/2017
CN        106625665 A      5/2017
(Continued)

OTHER PUBLICATIONS

International Search Report dated Mar. 3, 2020 in corresponding Applicaiton No. PCT/CN2019/128626; 5 pages.

*Primary Examiner* — Abby Y Lin
*Assistant Examiner* — Esvinder Singh

(57) ABSTRACT

The invention discloses high-precision mobile robot management and scheduling system, and relates to the technical field of industrial robots, comprising industrial robot, AGV, secondary positioning device and upper computer, wherein the secondary positioning devices are arranged on corresponding workstations of processing machine tool, when the processing machine tool performs processing tasks, the upper computer selects the AGV arranged with industrial robot and navigates the same to the secondary positioning device, and after the secondary positioning device and the chassis of the industrial robot are locked, the industrial robot can assist the processing machine tool in parts machining. The system in the invention perfectly combines the mobile robot and fixed robot, thereby achieving not only flexibility of mobile robot, but also the high precision of the fixed robot.

5 Claims, 3 Drawing Sheets

(58) Field of Classification Search
CPC ... B25J 9/08; B25J 9/162; B25J 9/1656; B25J 9/1664; G05B 19/41895; G05B 2219/31009; G05B 2219/31014; G05B 2219/31081; G05B 2219/31086; G05B 2219/31216; G05B 2219/32044; G05B 2219/32388; G05B 2219/40082; G05D 1/021; G05D 1/0225
See application file for complete search history.

(56) References Cited

U.S. PATENT DOCUMENTS

| | | | |
|---|---|---|---|
| 2020/0101609 A1* | 4/2020 | He | B25J 9/162 |
| 2020/0115169 A1* | 4/2020 | Condon | B65G 47/52 |
| 2021/0347037 A1* | 11/2021 | Yoneda | G05D 1/0297 |
| 2021/0387328 A1* | 12/2021 | Hahn | B25J 9/08 |

FOREIGN PATENT DOCUMENTS

| | | |
|---|---|---|
| CN | 208271028 U | 12/2018 |
| CN | 208914094 U | 5/2019 |
| CN | 110315521 A | 10/2019 |

\* cited by examiner

HIGH-PRECISION MOBILE ROBOT MANAGEMENT AND SCHEDULING SYSTEM

TECHNOLOGY FIELD

The invention relates to the technical field of industrial robots, in particular to a high-precision mobile robot management and scheduling system.

BACKGROUND ART

Industrial robots are a type of robots that require very high accuracy, especially manufacturing industrial robots for processing, assembly, welding and etc. The prior industrial robots are mainly equipped and fixed with mechanical arms. In the prior art, the position accuracy and attitude accuracy of fixed mechanical arms have respectively reached the accuracy level of 0.01 mm and 0.01°, and the mechanical arms have been widely used in fields that require extremely high accuracy, including aerospace.

Mobile robots expand the application scope and greatly increase the flexibility of industrial robots. There are many ways for industrial robots to move, such as moving along fixed rails, moving on a track, moving on wheels, etc., wherein the moving method of Automated Guided Vehicle (hereinafter referred as AGV) is the most flexible and fast. However, due to the addition of the walking part, the mobile robot system is more complicated, the accuracy of the mobile positioning is low, the rigidity of the bearing is low, etc., thereby the working accuracy of the robot is affected. There are many problems to be solved that AGV and industrial robots work in coordination, at present, there are few researches on the precision of mobile robots. Luo Jianming and others used the visual positioning system on the mobile robotic arm to calibrate hand-eye through the Levenberg-Marquardt optimization method, and then used fixed feature points to solve the camera position and pose, thereby compensating the positioning error of the mobile car, and the research achieved certain results, however, the achieved accuracy is not ideal for many processing occasions; in the study of the position accuracy of repeated drilling holes in aircraft assembly, Chen Dongdong used industrial camera to calibrate the coordinate system of robot workpieces, according to the error model, base coordinate error of industrial robot caused by AGV secondary is calculated calculated, and the error is corrected by the inverse distance weighting model, thereby the aperture deviation is ±0.01 mm, and a good effect is obtained. However, because the corrected error is not a real-time error, the effect of error correction will fluctuate to a certain extent, in addition, as the robot runs over time, mechanical wear and loose coordination will increase the error and affect the effect of error correction.

SUMMARY OF THE INVENTION

The invention provides a high-precision mobile robot management and scheduling system to solve the technical problems in the prior art.

The invention provides a high-precision mobile robot management and scheduling system, comprising industrial robot, AGV, secondary positioning device and upper computer, wherein the secondary positioning devices are arranged in a plurality and are respectively arranged on corresponding workstations of processing machine tool, the industrial robots and the AGVs are also arranged in a plurality, the industrial robots are detachably arranged on the AGVs or the secondary positioning devices, the processing machine tool and the AGVs are both in communication connection with the upper computer; when a processing task needs to be performed, the processing machining tool sends request information to the upper computer, the upper computer selects an AGV provided with an industrial robot and navigates the AGV to corresponding workstation of the processing machining tool sending the request information, the industrial robot on the AGV is locked by a secondary positioning device on the workstation, simultaneously, the AGV is released from being connected with the industrial robot.

Compared to the traditional mobile industrial robots, the high-precision mobile robot management and scheduling system in the invention has following advantages:

(1) the industrial robot is fixed when working, for example the fixed mechanical arms, with good rigidity and high precision, can be used to improve working accuracy by the technology thereof;

(2) industrial robots and AGVs have many-to-many relationship and "driver-passenger relationship" with flexible working methods. When an AGV breaks down, the movement and work of industrial robots can not be affected; vice versa;

(3) compared to the fixed-track mobile industrial robots, the robots with AGV are more flexible to move, better adaptable to the site, and lower in cost;

(4) the working accuracy of the industrial robot does not depend on the positioning accuracy of the AGV, therefore, the AGV has low requirement on positioning accuracy, and is only required sending the industrial robot to the workstation.

BRIEF DESCRIPTION OF ACCOMPANYING DRAWINGS

In order to more clearly explain the embodiments of the invention or the technical schemes in the prior art, the required drawings in the embodiments or the description of the prior art will be briefly introduced below, obviously, the drawings in the following description are only some embodiments of the invention, and for those skill in the art, other drawings can be obtained based on these drawings without any creative work.

PREFERRED EMBODIMENT OF THE INVENTION

The technical schemes in the embodiments of the invention will be described clearly and completely with reference to the accompanying drawings in the embodiments of the invention, obviously, the described embodiments are only a part of the embodiments of the invention, but not all the embodiments. Based on the embodiments of the invention, all other embodiments obtained by a person skilled in the art without making creative efforts should be included within the protection scope of the invention.

Figure 1:
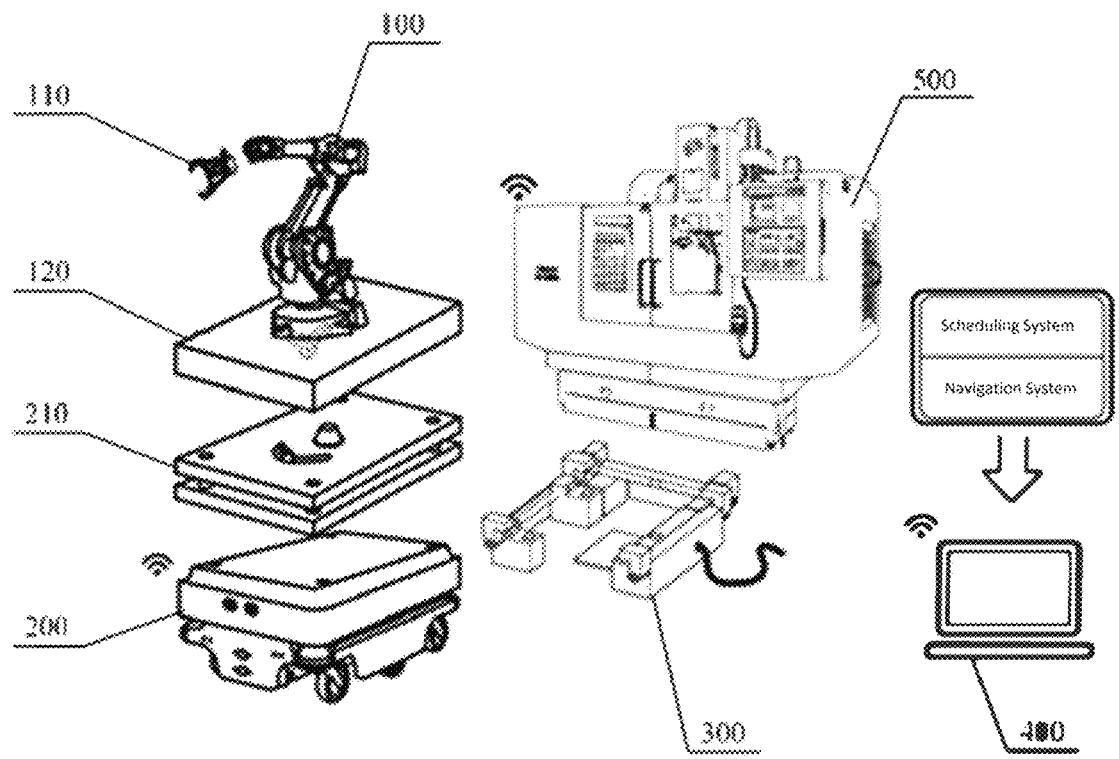
FIG. 1 shows the composition of a high-precision mobile robot management and scheduling system in the invention.
Figure 2:
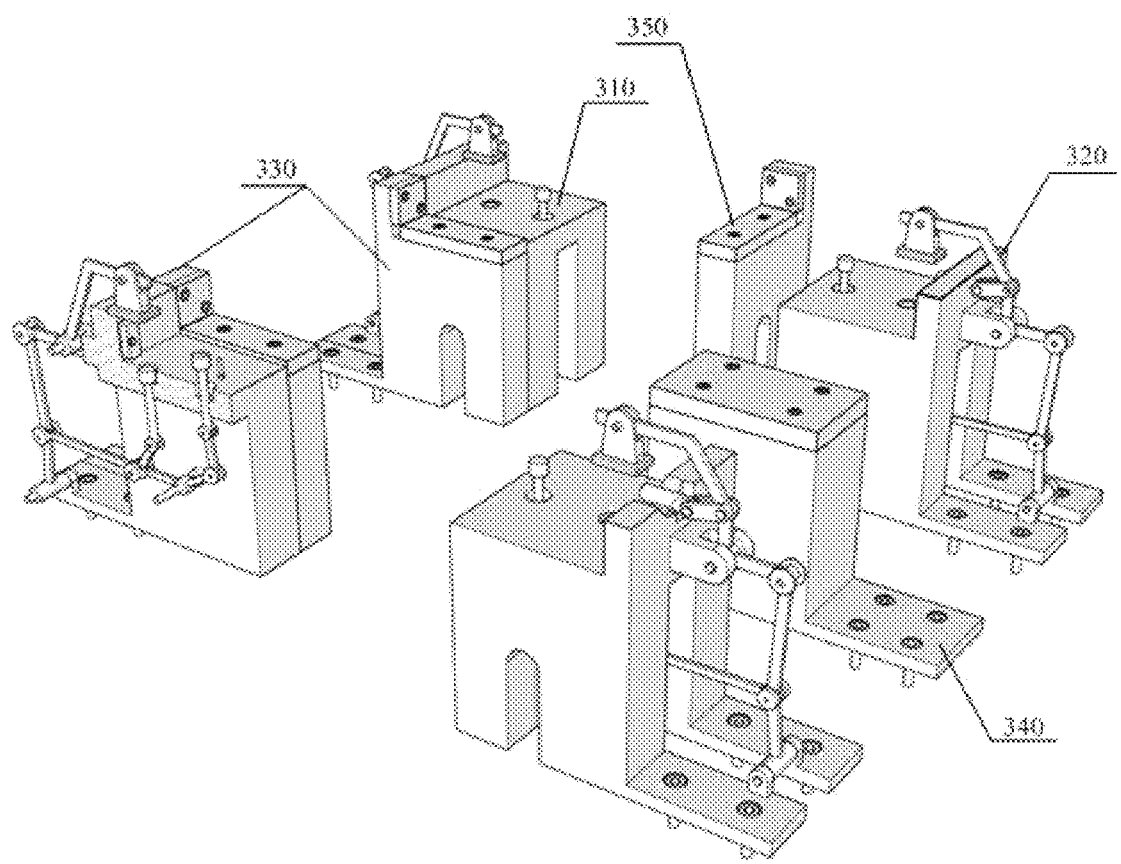
FIG. 2 shows the structure of the secondary positioning device in the invention.
Figure 3:
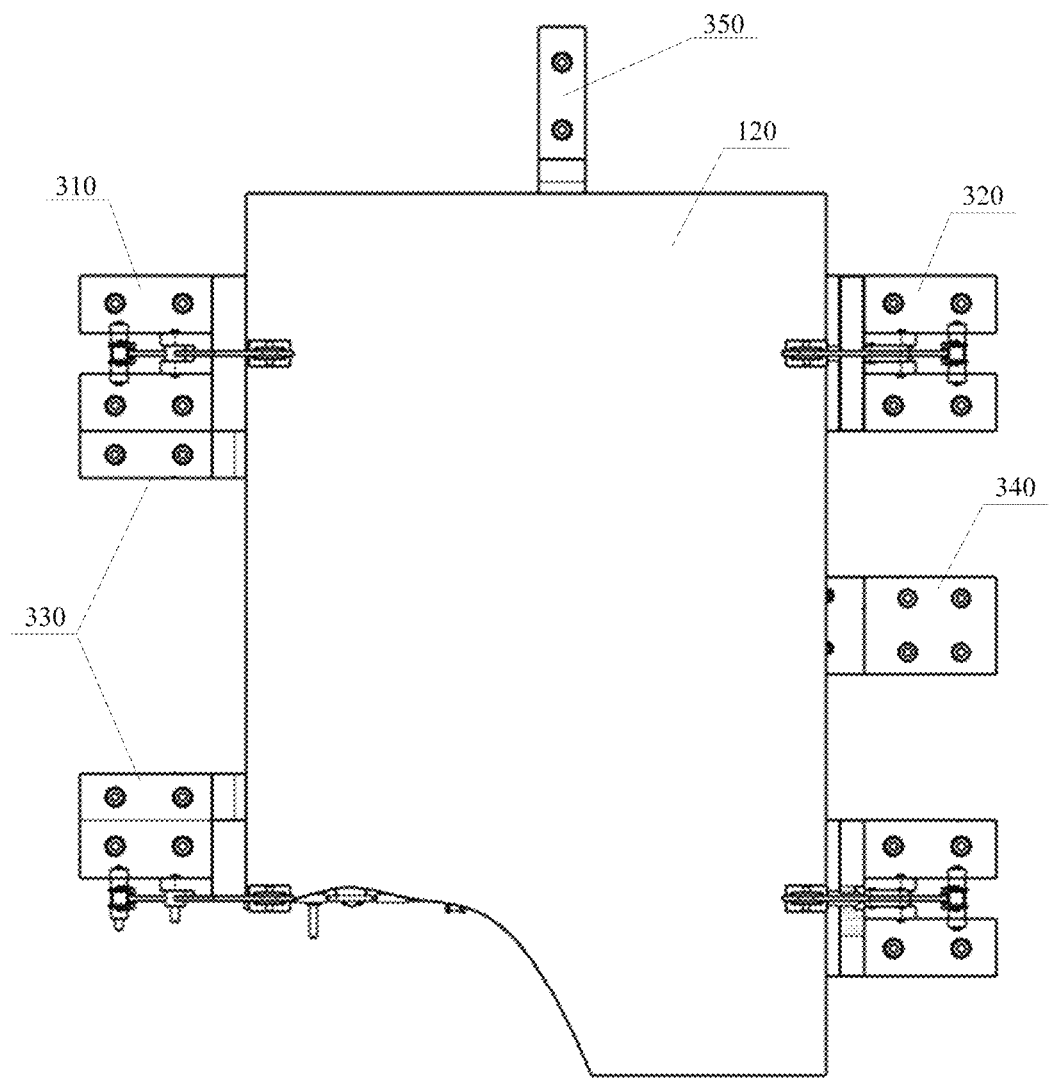
FIG. 3 shows a top view of the industrial robot chassis clamping on the secondary positioning device.
Figure 4:
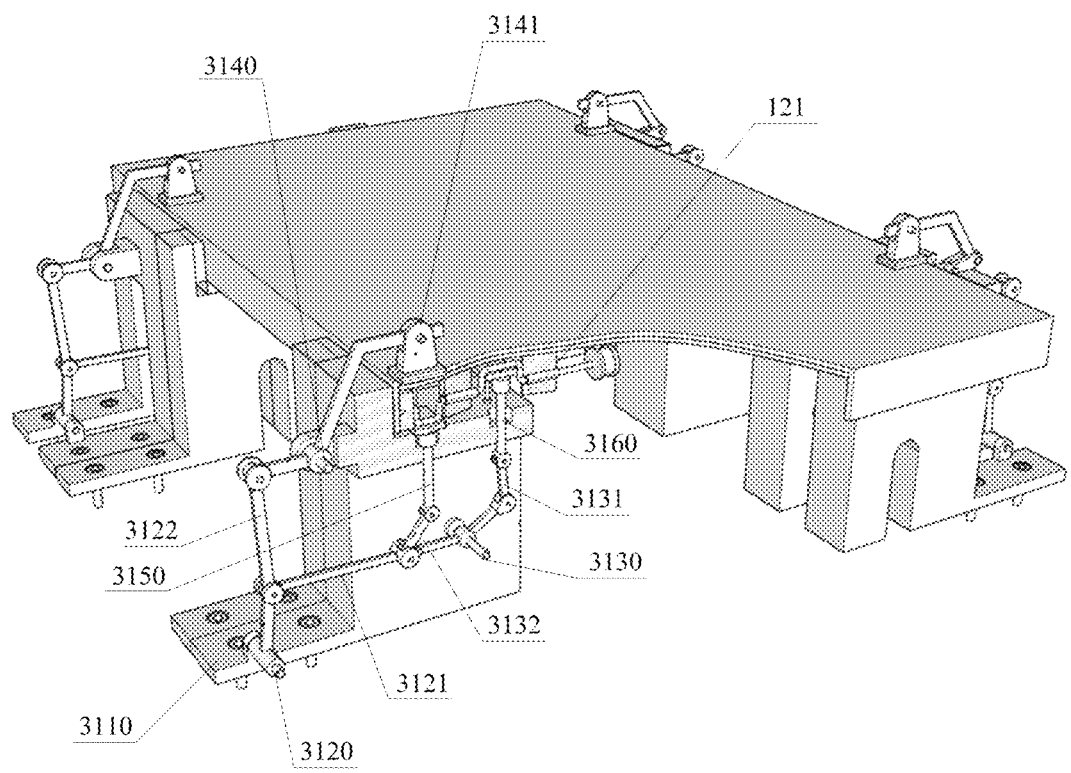
FIG. 4 shows a part section view of one side of the chassis and the secondary positioning device in FIG. 3.
Figure 5:
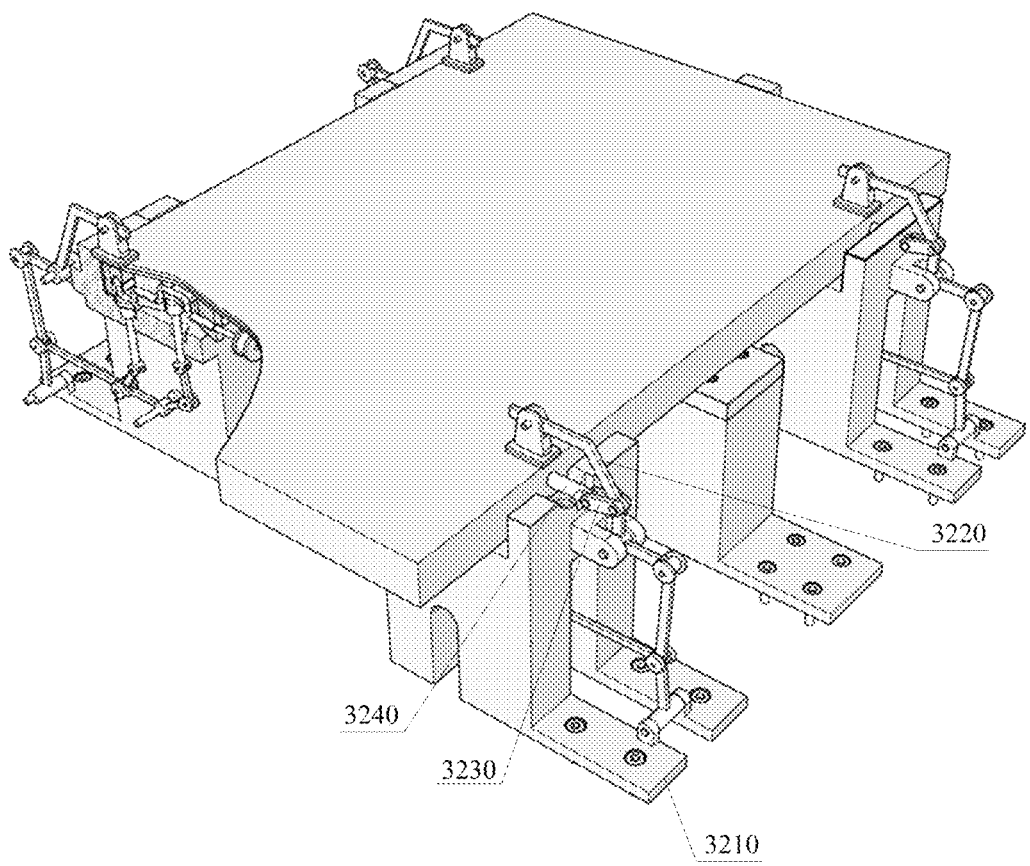
FIG. 5 shows a part section view of the other side of the chassis and the secondary positioning device in FIG. 3.

As shown in FIG. 1, the invention provides a high-precision mobile robot management and scheduling system, comprising industrial robot 100, AGV 200, secondary positioning device 300 and upper computer 400, the industrial robot 100 comprises mechanical arm and chassis 120 fixed on lower portion of the mechanical arm, the mechanical arm is arranged with replaceable end tools 110. The AGV 200 comprises vehicle body and bracket 210 arranged on top portion of the vehicle body, the vehicle body is provided with walking part, and the vehicle body is communicatively connected to the upper computer 400 through wireless communication, and the bracket 210 is detachably connected to the chassis 120 of the industrial robot 100.

The secondary positioning devices 300 are arranged in a plurality, each of the secondary positioning devices 300 is fixedly arranged on a workstation distributed in the processing field, and each workstation corresponds to a processing machine tool 500, the processing machine tool 500 is also communicatively connected to the upper computer 400 through wireless communication.

The upper computer 400 is provided with scheduling system software and navigation system software, when a processing machine tool 500 needs to process parts, a request information is sent to the upper computer 400, in response to the request information, the upper computer 400 randomly selects an AGV 200 in standby state by the scheduling system software, the AGV in standby state refers to an AGV provided with an industrial robot 100, and the industrial robot 100 is in idle state, after selecting the standby AGV 200, the upper computer 400 sends a movement control command to the AGV 200, and the navigation system software navigates the AGV 200 according to the position of the processing machine tool 500 that sends the request information, the AGV 200 moves to the secondary positioning device 300 corresponding to the processing machine tool 500 according to the navigation of the upper computer 400. After the AGV 200 moves into the place, the bracket 210 is released from the connection with the chassis of the industrial robot 100, the AGV 200 automatically moves to the designated area.

After the chassis of the industrial robot 100 is placed on the secondary positioning device 300, that is, locked with the secondary positioning device 300, the secondary positioning device 300 is provided with a power socket for supplying power to the industrial robot 100, after the chassis of the industrial robot 100 is locked on the secondary positioning device 300, power plug on the industrial robot 100 is inserted into the power socket, thereafter the industrial robot 100 starts to work, and cooperates with the processing machine tool 500 to perform components and parts processing.

When the processing task of the processing machine tool 500 is completed, a request information is sent by the processing machine tool 500 to the upper computer 400, in response to the request information, the upper computer 400 randomly selects an AGV 200 in idle state by the scheduling system software, the AGV in idle state refers to an AGV provided without an industrial robot 100, after selecting the idle AGV 200, the upper computer 400 sends a movement control command to the AGV 200, and the navigation system software navigates the AGV 200 according to the position of the processing machine tool 500 that sends the request information, the AGV 200 moves to the secondary positioning device 300 corresponding to the processing machine tool 500 according to the navigation of the upper computer 400. After the AGV 200 moves into the place, the industrial robot 100 is unlocked from the secondary positioning device 300, and the bracket 210 of the AGV 200 is connected to the chassis of the industrial robot 100, the AGV 200 together with the industrial robot 100 automatically move to the designated area.

Compared to the traditional mobile industrial robots, the high-precision mobile robot management and scheduling system in the invention has following advantages: (1) the industrial robot is fixed when working, for example the fixed mechanical arms, with good rigidity and high precision, can be used to improve working accuracy by the technology thereof; (2) industrial robots and AGVs have many-to-many relationship and "driver-passenger relationship" with flexible working methods. When an AGV breaks down, the movement and work of industrial robots can not be affected; vice versa; (3) compared to the fixed-track mobile industrial robots, the robots with AGV are more flexible to move, better adaptable to the site, and lower in cost; (4) the working accuracy of the industrial robot does not depend on the positioning accuracy of the AGV, therefore, the AGV has low requirement on positioning accuracy, and is only required sending the industrial robot to the workstation.

As shown in FIG. 2-5, the structure of the secondary positioning device 300 will be described in detail in the invention.

The secondary positioning device 300 comprises left clamping mechanism 310, right clamping mechanism 320, left positioning device 330, right positioning device 340, and rear positioning device 350, in the embodiment, the number of the left clamping mechanism 310, the right clamping mechanism 320, and the left positioning device 330 is two, the two left clamping mechanisms 310 are respectively arranged at two ends on left side of the workstation, the two right clamping mechanisms 320 are respectively arranged at two ends on right side of the workstation, the two left positioning device 330 are respectively arranged on and attached to the two left clamping mechanisms 310.

The right positioning device 340 is arranged between the two right clamping mechanism 320, the rear positioning device 350 is arranged on rear side of the workstation and arranged between a left clamping mechanism 310 and a right clamping mechanism 320.

The left clamping mechanism 310 comprises a left mounting block 3110, the left mounting block 3110 is fixed to the workstation with screws, and a lower mounting shaft 3120, a middle mounting shaft 3130, and an upper mounting shaft 3140 are rotatably arranged thereon, the axes of the lower mounting shaft 3120, the middle mounting shaft 3130, and the upper mounting shaft 3140 are parallel and horizontal. The lower mounting shaft 3120 is fixed and connected to a lower connecting rod, the middle mounting shaft 3130 is fixed and connected to two middle connecting rods, the upper mounting shaft 3140 is fixed and connected to two upper connecting rods, one end of the lower connecting rod is rotatably connected to a middle connecting rod through a first connecting rod 3121, two ends of the first connecting rod are both rotatably connected to the lower connecting rod and the middle connecting rod. The lower connecting rod is also rotatably connected to an upper connecting rod through a second connecting rod 3122, two ends of the second connecting rod 3122 are both rotatably connected to the lower connecting rod and the upper connecting rod, the connection point between the lower connecting rod and the first connecting rod 3121, and that between the same and the second connecting rod 3122 are coincided.

Two through holes are provided on top surface of the left mounting block 3110, a first ejector rob 3150 and a second ejector rob 3160 are respectively inserted into the two through holes, and the first ejector rob 3150 is rotatably connected to the connection point of the first connecting rod 3121 and the middle connecting rod through a third connecting rod 3132, two ends of the third connecting rod 3132 are respectively rotatably connected to the first ejector rob 3150 and the first connecting rob 3121. The second ejector rob 3160 is rotatably connected to the other middle connecting rod through a fourth connecting rod 3131, two ends of the fourth connecting rod 3131 are respectively rotatably connected to the second ejector rob 3160 and the middle connecting rod. One end of the other upper connecting rod is arranged above the left mounting block 3110, and a clamping block 3141 is rotatably arranged on one end of the upper connecting rod.

The chassis 120 of the industrial robot 100 is provided with two chutes on the left and right sides of the bottom surface, and the positions of the two chutes on the left side are corresponded to the positions of the first ejector rod 3150 and the second ejector rod 3160, a crank shaft 121 is rotatably arranged in the two chutes, the crank shaft 121 is provided with two shaft necks in opposite directions, the two shaft necks are respectively arranged in two chutes, one end of the crank shaft 121 are connected to driving device by passing through side wall of the chute, the driving device is a motor or other equipment arranged on bottom surface of the chassis 120, the driving device drives the shaft necks in the opposite directions in two chutes to rotate when in operation, thereby pushing the first ejector rod 3150 and the second ejector rod 3160 move up and down.

In the embodiment, the components on the left clamping mechanism 310 that are in contact with the chassis 120 have gaskets, such as top end of the first ejector rod 3150, the top end of the second ejector rod 3160, and the bottom surface of the clamping block 3141, the clamping tightness can be adjusted by changing gaskets with different thicknesses.

When the AGV 200 carries the industrial robot 100 into the secondary positioning device 300, the chassis 120 is inserted from front side of the secondary positioning device 300, that is, the side opposite to the rear positioning device 350, simultaneously, the top ends of the first ejector rod 3150 and the second ejector rod 3160 both protrude from the through holes, and the two chutes on left side of the bottom surface of the chassis 120 are respectively arranged above the first ejector rod 3150 and the second ejector rod 3160, with the movement of the AGV 200, the chassis 120 is finally clamped inside the secondary positioning device 300, and the bottom surface of the chassis 120 is in contact with top surfaces of the two left clamping mechanisms 310 and the two right clamping mechanism 320. Thereafter the driving device on the bottom surface of the chassis 120 rotates, driving the two shaft necks on the crank shaft 121 to rotate up and down, and the first ejector rod 3150 is compressed by corresponding shaft necks and starts to fall, and the second ejector rod 3160 rises synchronously under the influence of the connection relationship, and simultaneously, the clamping block 3141 is pressed down synchronously, finally the clamping block 3141 is only pressed against the top surface of the chassis 120, thereby the chassis 120 is locked in the vertical direction.

The right clamping mechanism 320 has all the structural features of the left clamping mechanism 310, and the right clamping mechanism 320 also comprises a resisting rod 3240, and the right mounting block of the right clamping mechanism 320 is provided with resisting hole on the side wall facing the right side surface of the chassis 120, the axis of the resisting hole is perpendicular to the side surface of the chassis 120, the resisting rod 3240 is inserted into the resisting hole and slides along the axis in the resisting hole. One end of the resisting rod 3240 facing away from the chassis 120 is rotatably connected to an upper connecting rod 3220 of the right clamping mechanism 320 through a connecting piece 3230, a clamping block is arranged at one end of the upper connecting rod 3220, and two ends of the connecting piece 3230 are rotatably connected to the resisting rod 3240 and the upper connecting rod 3220, when the upper connecting rod 3220 rotates toward the chassis 120, the clamping block is pressed against the top surface of the chassis 120, the resisting rod 3240 moves toward the chassis 120 by the driving of the connecting piece 3230, and is finally tightly pressed against the side surface of the chassis 120, thereby the chassis 120 is locked in the horizontal direction.

After the chassis 120 is locked by the left clamping mechanism 310 and the right clamping mechanism 320, the left positioning device 330, the right positioning device 340, and the rear positioning device 350 are used for positioning the chassis 120 in conjunction with error measurement devices arranged everywhere on the chassis 120 to improve the positioning accuracy of the industrial robot 100.

Although the preferred embodiments of the invention have been described, those skilled in the art can make additional changes and modifications to these embodiments once they learn the basic inventive concept. Therefore, the appended claims are intended to be interpreted as including the preferred embodiments and all changes and modifications falling within the scope of the invention.

Obviously, those skilled in the art can make various modifications and variations to the invention without departing from the spirit and scope of the invention. In this way, if these modifications and variations of the invention fall within the scope of the claims of the invention or equivalent technologies thereof, the invention is also intended to include these modifications and variations.

The invention claimed is:

1. A high-precision mobile robot management and scheduling system, comprising industrial robot, AGV, secondary positioning device and upper computer, wherein the secondary positioning devices are arranged in a plurality and are respectively arranged on corresponding workstations of processing machine tool, the industrial robots and the AGVs are also arranged in a plurality, the industrial robots are detachably arranged on the AGVs or the secondary positioning devices, the processing machine tool and the AGVs are both in communication connection with the upper computer; when a machining task needs to be performed, the processing machining tool sends request information to the upper computer, the upper computer selects an AGV provided with an industrial robot and navigates the AGV to corresponding workstation of the processing machining tool sending the request information, the industrial robot on the AGV is locked by a secondary positioning device on the workstation, simultaneously, the AGV is released from being connected with the industrial robot;

wherein
the secondary positioning device comprises a plurality of clamping mechanisms and a plurality of positioning devices, the plurality of clamping mechanisms are respectively arranged on left and right sides of the workstation, the plurality of positioning devices are respectively arranged on left side, right side and rear side of the workstation;

the positioning devices on the left side are arranged on and attached to the clamping mechanisms on the left side, the positioning devices on the right side is arranged between two clamping mechanisms on the right side, the positioning device on the rear side is arranged between a clamping mechanism on the left side and a clamping mechanism on the right side;

each of the clamping mechanisms comprises a mounting block and a connecting rod mechanism, the mounting block is fixed to the workstation, the connecting rod mechanism is arranged on the mounting block, and the connecting rod mechanism comprises a clamping block;

a chassis of the industrial robot is equipped with a driving device and a crank shaft connected to the driving device; the crank shaft is provided with two shaft necks in opposite directions, the two shaft necks are matched with the connecting rod mechanism;

when the driving device drives the crank shaft to rotate, the two shaft necks drive the connecting rod mechanism to operate, and the clamping block in the connecting rod mechanism move up and down, locking or unlocking the chassis of the industrial robot.

2. The high-precision mobile robot management and scheduling system of claim 1, wherein the processing machine tool sends request information to the upper computer after the processing task is completed, the upper computer selects an AGV without an industrial robot and navigates the AGV to corresponding workstation of the processing machining tool sending the request information, the AGV is connected to the industrial robot on the secondary positioning device, simultaneously, the industrial robot is unlocked from the secondary positioning device, and the AGV together with the industrial robot move to a specified position.

3. The high-precision mobile robot management and scheduling system of claim 2, wherein the upper computer is provided with scheduling system software and navigation system software, the scheduling system software is used to randomly select AGV with the industrial robot and AGV without the industrial robot, and the navigation system software is used to navigate the AGV to corresponding workstation of the processing machine tool.

4. The high-precision mobile robot management and scheduling system of claim 1, wherein both the processing machine tool and the AGV are connected to the upper computer through wireless communication.

5. The high-precision mobile robot management and scheduling system of claim 1, wherein the secondary positioning device is provided with a power socket for the industrial robot, after the industrial robot is locked on the secondary positioning device, power plug on the industrial robot is inserted into the power socket.

* * * * *